United States Patent [19]

Paul et al.

[11] Patent Number: 5,026,481
[45] Date of Patent: Jun. 25, 1991

[54] LIQUID MEMBRANE CATALYTIC SCALE DISSOLUTION METHOD

[75] Inventors: James M. Paul, DeSoto; Richard L. Morris, Duncanville, both of Tex.

[73] Assignee: Mobil Oil Corporation, Fairfax, Va.

[21] Appl. No.: 493,165

[22] Filed: Mar. 14, 1990

Related U.S. Application Data

[63] Continuation-in-part of Ser. No. 332,147, Apr. 3, 1989.

[51] Int. Cl.$^5$ .................. B01D 61/38; B01D 61/40
[52] U.S. Cl. .................. 210/638; 166/312; 210/643
[58] Field of Search .......... 210/643, 749, 751, 758, 210/759, 638; 166/312

[56] References Cited

U.S. PATENT DOCUMENTS

| | | | |
|---|---|---|---|
| 2,877,848 | 3/1959 | Case | 166/42 |
| 3,660,287 | 5/1972 | Quattrini | 252/8.55 B |
| 4,190,462 | 2/1980 | De Jong et al. | 134/2 |
| 4,215,000 | 7/1980 | De Jong et al. | 252/8.55 B |
| 4,259,189 | 3/1981 | Li | 260/29.6 AN |
| 4,288,333 | 9/1981 | van Zon et al. | 252/8.55 B |
| 4,292,181 | 9/1981 | Li et al. | 210/638 |
| 4,621,694 | 11/1986 | Wilson et al. | 166/312 |
| 4,708,805 | 11/1987 | D'Muhala | 210/698 |

Primary Examiner—Frank Sever
Attorney, Agent, or Firm—Alexander J. McKillop; Charles J. Speciale; Charles A. Malone

[57] ABSTRACT

A liquid membrane method for removing scale deposits wherein a novel chelating composition is utilized. The composition used in the external and internal aqueous phases of said membrane comprises an aqueous solution having a pH of about 8 to about 14, and a polyaminopolycarboxylic acid chelant. Additionally, a catalyst or synergist is used in the external phase only. Preferred chelants comprise diethylenetriaminepentaacetic acid (DTPA) or ethylenediaminetetraacetic acid (EDTA), salts, and mixtures thereof. The catalyst used in the external phase comprises a monocarboxylic acid, preferably a substituted acetic acid such as mercaptoacetic acid, hydroxyacetic acid and aminoacetic acid or an aromatic acid such as salicylic acid. When the solution containing the composition is contacted with a surface containing a scale deposit, the deposit dissolves substantially more scale quicker than heretofore possible.

31 Claims, 3 Drawing Sheets

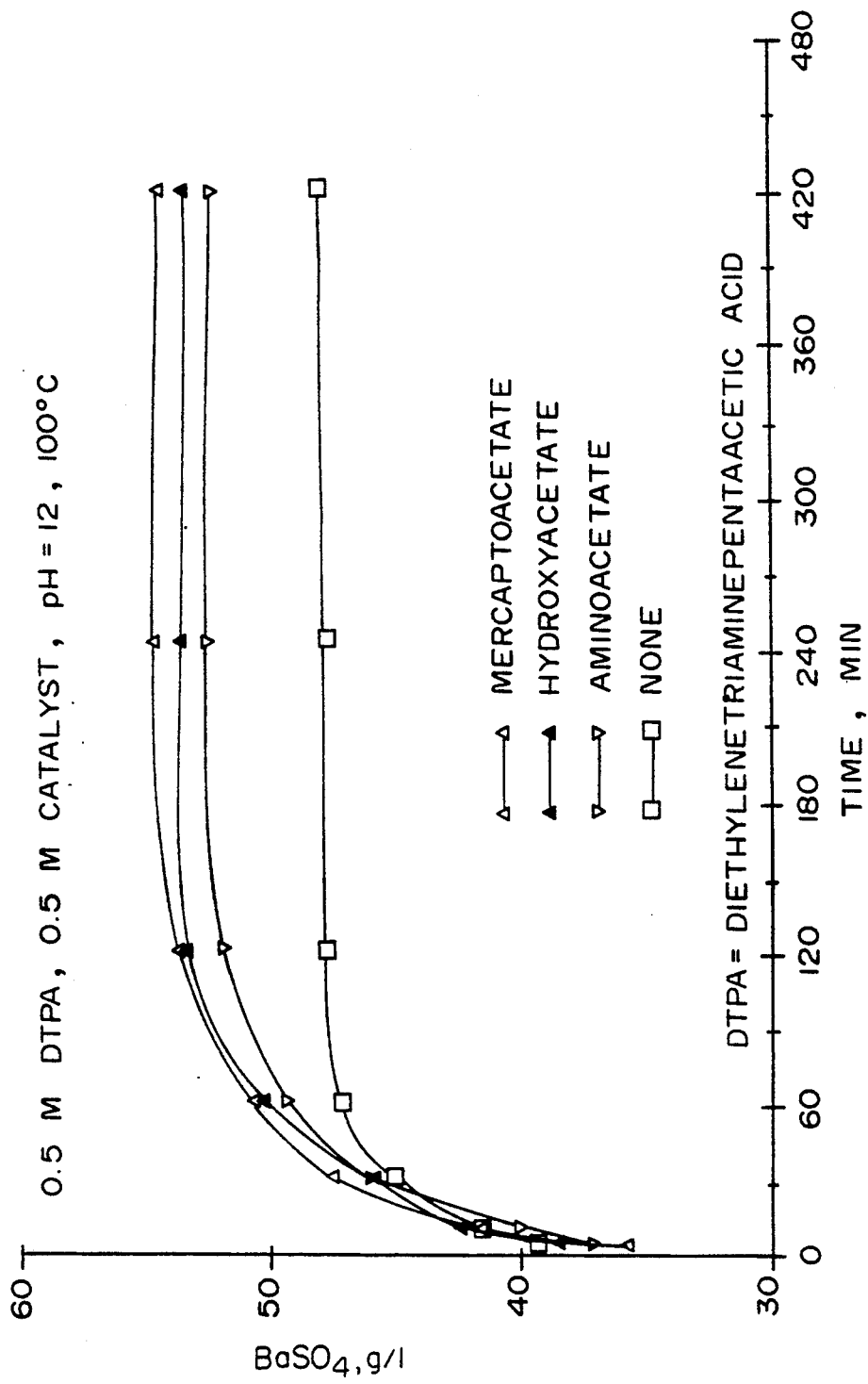

LIQUID MEMBRANE CATALYTIC SCALE DISSOLUTION METHOD

This application is a continuation-in- part of prior co-pending application Ser. No.07/332,147, filed Apr. 3, 1989, of J. M. Paul and R. L. Morris. It is related to application Ser. No. 369,897 filed June 22, 1989, now U.S. Pat. No. 4,980,077 which issued Dec. 25, 1990. It is also related to pending application Ser. No. 431,114 which was filed on Nov. 3, 1989.

FIELD OF THE INVENTION

This invention relates to compositions which are effective for solubilizing and removing scale, particularly strontium and barium sulfate scale, from surfaces having scale deposits. It is particularly useful for the removal of such scale from oil field equipment including downhole pipe, tubing and casing as well as subterranean formations. It is also applicable to the removal of these scale deposits from other equipment such as boilers and heat exchangers.

BACKGROUND OF THE INVENTION

Many waters contain alkaline earth metal cations, such as barium, strontium, calcium and magnesium, and anions, such as sulfate, bicarbonate, carbonate, phosphate, and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change in pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expensive problem in many industrial water systems, in production systems for oil and gas, in pulp and paper mill systems, and in other systems, causing delays and shutdowns for cleaning and removal.

Barium and strontium sulfate scale deposits present a unique and particularly intractable problem. Under most conditions, these sulfates are considerably less soluble in all solvents than any of the other commonly encountered scale-forming compounds, as shown by the comparative solubilities given in Table 1 below.

TABLE 1

| Comparative Solubilities, 25° C. in Water. | |
|---|---|
| Scale | Solubility, mg./l. |
| Gypsum | 2080.0 |
| Strontium sulfate | 140.0 |
| Calcium Carbonate | 14.0 |
| Barium sulfate | 2.3 |

It is generally acknowledged that barium sulfate scale is extremely difficult to remove chemically, especially within reasonably short periods of time. Solvents which have been found to work generally take a long time to reach an equilibrium concentration of dissolved barium sulfate, which itself is usually of a relatively low order. Consequently, barium sulfate must be removed mechanically or the equipment, e.g. pipes, etc., containing the deposit must be discarded.

The incidence of barium sulfate scale is worldwide, and it occurs principally in systems handling subsurface waters. Because of this, the barium sulfate scale problem is of particular concern to the petroleum industry as water is generally produced with petroleum. As time goes on, more petroleum is produced by the waterflooding method of secondary recovery, implying even greater volumes of produced water. Scale may occur in many different places, including production tubing, well bore perforations, the area near the well bore, gathering lines, meters, valves and in other production equipment. Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

Barium sulfate scale is particularly troublesome when sulphate-rich seawater is used as an injection fluid in oil wells whose formation water is rich in barium ions. This particular aspect of the barium scale problem is severe in some U.S. oil fields as well as some older North Sea oil fields. Scaling of this nature is also expected to occur during advanced production stages in other North Sea fields particularly after seawater breakthrough has taken place.

Another problem associated with the formation of barium and strontium sulfate scales is that radium, another member of the alkaline earth group of metals, tends to be deposited at the same time so that the equipment becomes radioactive. Eventually the equipment may become unusable for safety reasons alone. At present, a considerable amount of oil field tubular goods are in this condition and cannot be readily restored to usable condition because of the difficulty of removing the radioactive scale.

Various proposals have been made in the past for removing barium sulfate scale chemically. Most of these processes have utilized chelating or complexing agents, principally the polyaminopolycarboxylic acids such as ethylenediaminetetraacetic acid (EDTA) or diethylenetriaminepentaacetic acid (DTPA).

U.S. Pat. No. 2,877,848 (Case) discloses the use of EDTA in combination with various surfactants for this purpose. U.S. Pat. No. 3,660,287 (Quattrini) discloses the use of EDTA and DTPA in the presence of carbonate ion at relatively neutral pH (6.5-9.5) and U.S. Pat. No. 4,708,805 (D'Muhala) discloses a process for the removal of barium sulfate scale by sequestration using an aqueous solution of citric acid, a polycarboxylic acid such as carbazic acid, and an alkylene-polyaminopolycarboxylic acid such as EDTA or DTPA. The preferred aqueous sequestering solutions have a pH in the range of about 9.5 to about 14, provided by a base such as potassium hydroxide or potassium carbonate.

Another approach which has recently been made is to use a polyether in combination with the aminopolycarboxylic acid. U.S. Pat. No. 4,190,462 (deJong) discloses that barium sulfate scale can be removed from remote locations extending into a subterranean earth formation by contacting the scale with an aqueous solution consisting essentially of water, a monovalent cation salt of a monocyclic macroyclic polyamine containing at least two nitrogen-linked carboxymethyl groups and enough monovalent basic compound to provide a solution pH of about 8. Similar disclosures are to be found in U.S. Pat. Nos. 4,215,000 and 4,288,333. These polyether materials have, however, the disadvantage of being costly which is a severe drawback for oil field use where cost is a major factor.

Although many of these known compositions will remove scale, the rate of dissolution is slow and the amount of scale dissolved is small. Therefore, what is needed is a liquid membrane system that uses chelating agents in combination with a catalyst to remove scale at a substantially increased rate and a high capacity.

SUMMARY OF THE INVENTION

This invention is directed to a liquid membrane process or technique for removing scale-forming ions from boreholes, near well bore areas, and other oil and gas production equipment. This method includes contacting said scale with a three-phase emulsion. The emulsion includes an aqueous external phase and an aqueous internal phase, separated by a liquid hydrocarbon phase. The external phase contains a first chelating or complexing agent and a catalyst for dissolution of said scale. Said catalyst comprises an anion of a monocarboxylic acid such as acetic acid, hydroxyacetic acid, mercaptoacetic acid or an aromatic acid such as salicylic acid. The first complexing agent comprises a polyaminopolycarboxylic acid such as EDTA or DTPA. The scale is removed under alkaline conditions, preferably at pH values of at least 10, usually 10–14, with best results being achieved at about pH 12. The hydrocarbon phase is immiscible with the two aqueous phases and it contains a second complexing agent. This second complexing agent is capable of forming a complex with one or more of the ions in said scale-forming compounds. Said second complexing agent has a complexing strength greater than the first complexing agent.

Complexes of ions with said first complexing agent are transported in said hydrocarbon phase by a suitable phase transfer agent. An internal aqueous phase is contained in and is immiscible with the hydrocarbon phase. The internal aqueous phase contains a third complexing agent capable of forming a third complex with said scale-forming ions. The strength of the complex of the scale-forming ions and third complexing agent is much greater than the strength of the complex of the scale-forming ions of the first and second complexing agents. Scale-forming ions from scale dissolve quickly into the aqueous external phase. These ions are complexed in the hydrocarbon membrane phase and are then drawn into the aqueous internal phase because of the stronger complexing strength of the third complexing agent. Weak and difficult soluble scales of barium and/or strontium sulfate are removed from borehole perforations, near well bore areas, and metal surfaces.

The concentration of synergist or catalyst in said external phase only is usually about 0.01M to about 1.0M, preferably about 0.5M. Substantially improved scale dissolution rates are obtained when the aqueous solution containing the composition is at a temperature of about 25° to about 100° C. Higher temperatures are obtainable downhole because at greater formation depths higher existing pressures will raise the boiling point of the aqueous solution. Consequently greater scale removal rates may be attained.

It is therefore an object of this invention to provide an efficient and novel way to remove scale from oil and gas production equipment.

It is a further object of this invention to remove intractable barium or strontium sulfate scale, or other similar scale generally found downhole in hydrocarbonaceous fluid producing equipment.

It is therefore another object of this invention to provide for a novel liquid membrane composition for dissolving alkaline earth metal sulfate scale at substantially quicker rates than heretofore possible.

It is still another object of this invention to provide a method of solubilizing barium or strontium sulfate thus enabling the removal of adherent barium and strontium sulfate scales, deposits and crystals from surfaces.

It is yet another object of this invention to provide a liquid membrane composition which will produce substantially higher levels of dissolved barium, strontium, calcium, and other alkaline earth sulfate scale than heretofore possible.

It is an even yet further object of this invention to provide for a liquid membrane composition that can be used to remove scales, particularly barium and strontium sulfate scales, deposits, and crystals from above-ground equipment, e.g., boilers and heat exchangers.

BRIEF DESCRIPTION OF THE DRAWINGS

FIG. 1 is a graph which shows the rate of dissolution of barium sulfate in solutions of DTPA containing various substituted acetic acids as synergists.

DESCRIPTION OF THE PREFERRED EMBODIMENTS

Figure 1A:
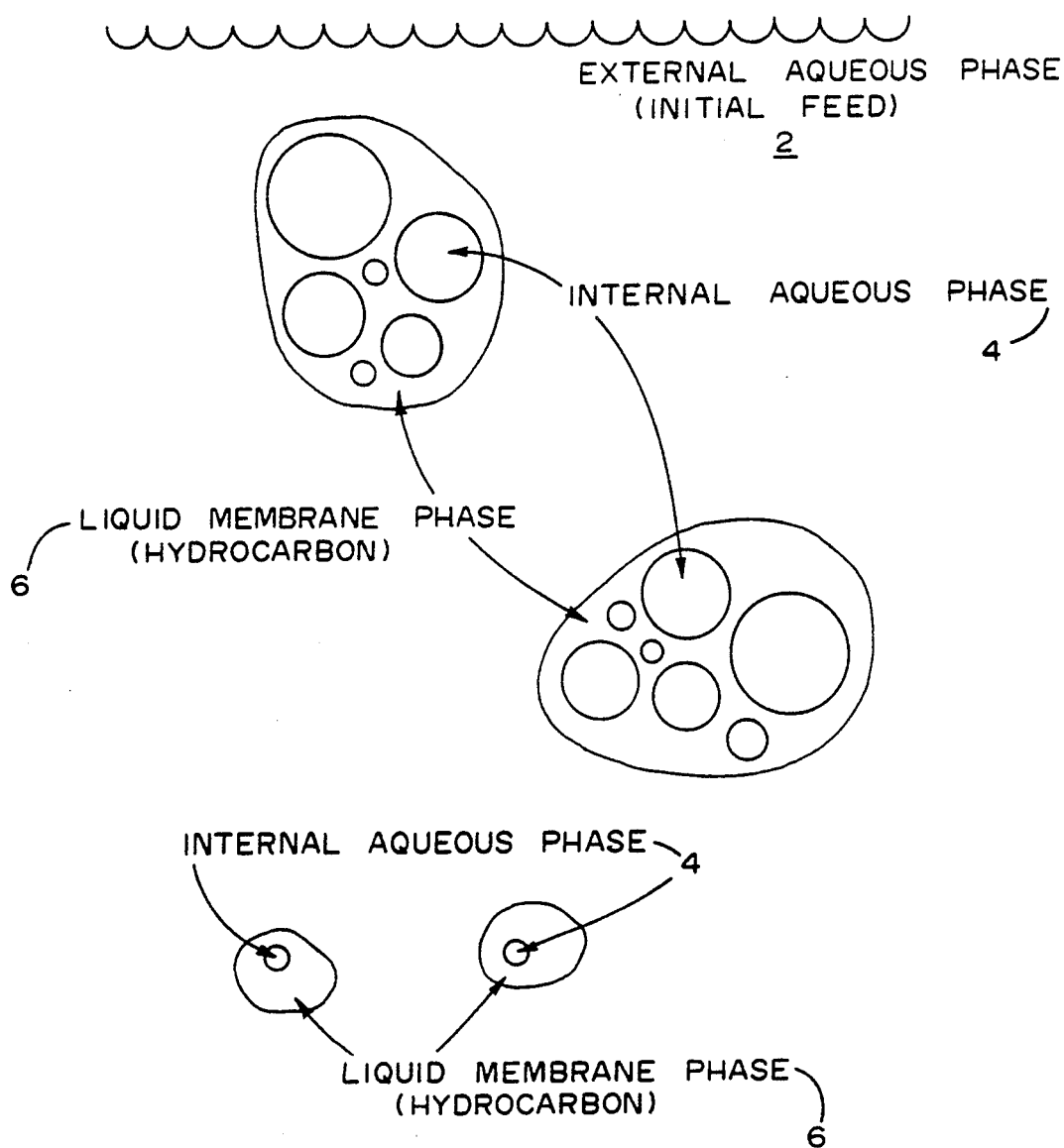
FIG. 1a is a schematic representation of a liquid membrane system.

In the practice of this invention, fluid is removed from a wellbore which contains scale. These fluids can be removed by an inert buffer phase. After removal of the wellbore fluids, an emulsion containing a liquid membrane phase which encases droplets of an internal aqueous phase is mixed with an external aqueous phase and is injected into the wellbore. The internal aqueous phase is thus separated from the external aqueous phase by a hydrocarbon containing liquid membrane phase. Upon injection into the wellbore, the external aqueous phase bathes and contacts scales deposited in borehole perforations and other areas within the wellbore and formation. After remaining in contact with downhole surfaces requiring scale removal, the emulsion is pumped to the surface after lapse of a desired time.

In another embodiment pumps, pipes, valves and other production equipment can be removed and placed within a vessel suitable therefor. These parts can then be immersed in an emulsion as discussed above for the removal of scale. A method for scale removal by use of a liquid membrane is disclosed in U.S. Pat. No. 4,621,694, which issued to Wilson et al. on Nov. 11, 1986. This patent is hereby incorporated by reference herein in its entirety.

Once the liquid membrane system has become saturated or has reached its capacity to retain scale-forming ions, the emulsion may be subjected to a deemulsification process to remove the scale-forming ions from the liquid internal aqueous phase and the hydrocarbonaceous liquid membrane phase. Methods for deemulsification of the liquid membrane can be found in U.S. Pat. No. 4,292,181, issued to Li et al. which is hereby incorporated by reference herein.

A wide range of temperatures may be utilized in the process of the instant invention since temperature is not critical. There would, however, be a lower and an upper limit which would be satisfactory for separation with a liquid phase surfactant membrane. The lower temperature should be higher than the freezing temperature of any of the liquids contacted, such as well water. It will also have to be higher than the freezing temperature of the emulsified aqueous mixture so that flow and mass transfer will be facilitated. Typical temperatures vary from above about 0° to about 100° C. or higher depending upon the depth to which the system is injected into the formation. A temperature of about 25° to about 100° C. is preferred. If the desired temperature cannot be obtained in the formation or wellbore, it can be heated on the surface prior to directing the emulsified aqueous mixture into the wellbore. Once in contact with surfaces requiring treatment, the mixture is allowed to remain there for about ten minutes to about 7 hours.

Upon placement of the emulsified aqueous mixture downhole into a well, temperatures may be encountered substantially above 60° C. Downhole temperatures in a hydrocarbonaceous well can vary from about 15° to about 200° C. depending upon the well depth. Temperatures up to about 200° C. will not affect the emulsified aqueous mixture, providing appropriate emulsifying agents are used, as is known to those skilled in the art.

This method provides a novel process for the dissolution of scales, particularly intractable $BaSO_4$ and $SrSO_4$. Referring to the drawing FIG. 1a, a liquid membrane solvent medium for scales encountered in production equipment and wellbores typically consists of an external aqueous phase 2 which bathes said scale. Said external aqueous phase 2 contains an aqueous solution having a pH of from about 8 to about 14, a first chelating or complexing agent, and a catalyst or synergist. Said catalyst comprises an anion or anions of at least one monocarboxylic acid. The acid may be substituted with various functional groups, especially electronegative groups such as hydroxyl, amino, halo or mercapto. The acid may also be unsubstituted. The lower substituted fatty acids such as the $C_1$–$C_3$ substituted fatty acids where the substituent is an electronegative group such as hydroxy, mercapto, or amino are suitable since they have good solubility in oilfield waters. Additionally, they are readily available and relatively inexpensive. Suitable acids of this type include mercaptoacetic acid, aminoacetic acid and hydroxyacetic acid. Unsubstituted fatty acids such as acetic acid and formic acid have not been found to provide any major improvement in scale removal with DTPA as a chelant and are therefore not preferred. Aromatic carboxylic acids may also be used when they have an adequately high solubility in water. The acid may have substituents other than the carboxyl group on the aromatic nucleus, for example, hydroxyl as in salicylic acid which is a preferred acid of this type. Other aromatic carboxylic acids with carboxyl groups attached directly to the aromatic nucleus may also be used. The preferred acids have been found to enhance the rate of barium sulfate scale dissolution using polyaminopolycarboxylic chelants, especially DTPA, to a significant and useful degree, so that dissolution of oilfield scales is appreciably accelerated by the use of these compositions.

It has been found that the action of the catalyst or synergist may be selective for the chelant. For example, salicylate produces a significant increase in scale removal with the chelant DTPA but only a slight improvement with EDTA. Use of DTPA is therefore favored not only because it generally shows an improved propensity in itself to remove alkaline earth metal sulfate scales but also because it exhibits better response to a number of these synergists. The complexing agent comprises polyaminopolycarboxylic acid such as EDTA or DTPA, salts and mixtures thereof. The first complexing agent will have a lower chelating strength than the chelating or complexing agent which will be used in either internal aqueous phase 4 or liquid membrane phase 6.

Complexing agents which are preferred for use herein comprise ethylenediaminetetraacetic acid (EDTA) or diethylenetriaminepentaacetic acid (DTPA) and salts thereof. EDTA and DTPA are preferred to be used in an aqueous solution having a concentration of about 0.1 to about 1.0M.

The concentration of catalyst or synergist in the aqueous solvent will be of a similar order. Thus, the amount of carboxylate anion in the solvent should normally be at least 0.1M in order to achieve a perceptible increase in the efficiency of the scale removal. Concentrations from about 0.3M up to about 0.6M will give good results. Although higher concentrations of the synergist e.g. above 1.0M may be used, there is generally no advantage to doing so because the efficiency of the process will be lower at excess catalyst concentrations. Again, this economic penalty is particularly notable in oilfield operations.

As with the chelant, the carboxylate synergist may be added as the free acid or the salt, preferably the potassium salt. If the free acid is used, addition of the potassium base to provide the requisite solution pH will convert the acid to the salt form under the conditions of use.

The scale dissolution ability of the chelant used is substantially enhanced by the addition of a catalyst into the aqueous solution. When said catalyst is used in the external aqueous phase, about 80% to about 90% of said scale is solubilized in about 10 minutes when used in combination with EDTA or DTPA. Salts of EDTA or DTPA and mixtures thereof can be used for the dissolution of barium sulfate.

$BaSO_4$, $SrSO_4$, $CaSO_4$ and $CaCO_3$ are dissolved in the external aqueous phase. $Ba^{++}$, $Sr^{++}$ and $Ca^{++}$ ions are collected in the liquid membrane phase by a chelating agent. Afterwards, said ions diffuse through said liquid membrane into the encased droplets in the internal aqueous phase. These ions continually accumulate in droplets of the internal aqueous phase which contains a third chelating agent. The composition of said second chelating agents is such that the accumulation of said ions is markedly greater than the concentration in said external aqueous phase. Continuous migration of said ions into the external aqueous phase into the liquid membrane phase and into droplets of said internal aqueous phase causes films of scale to be progressively removed from surfaces where they have been deposited. The scale is usually in the form of an adherent deposit of the scale-forming mineral on metal surfaces which have been exposed to water containing scale-forming components. These components comprise alkaline earth metals including calcium, strontium and barium, together with variable amounts of radium, depending upon the origin of the waters.

The mode of operation of the catalyst is not presently understood. While not desiring to be bound to a particular theory concerning the actual mechanism of this activity in converting or dissolving scale, it is believed that adsorption of the catalyst or synergist on the barium sulfate surface may modify the surface crystal structure in such a way that barium in the modified crystal is easily removed by the chelating agent.

The effect of cations on scale dissolution is also very important to the success of the scale solvent, especially when added with the sizable portion of caustic required to adjust the pH to 12. Dissolution of the caustic is enhanced as the size of the cation is increased, i.e. lithium, sodium, potassium and cesium. Lithium and sodium hydroxides in the presence of EDTA, or DTPA, and catalysts are not soluble at a pH of 12, the optimum value. Cesium is too difficult to obtain, both in quantity and price. Therefore, potassium hydroxide, in the form of caustic potash, is the preferred pH adjusting reagent.

One example of an external phase which can be used comprises 0.10 to about 0.25M DTPA and 0.3M of the carboxylate catalyst adjusted to a pH of 12 with potassium hydroxide. Another example of an external phase for use herein comprises 0.10 to about 0.25M EDTA and 0.5M KF adjusted to a pH of 12 with potassium hydroxide.

Referring to FIG. 1a, internal aqueous phase 4 in the form of droplets contains one or more very strong chelating agents for $Ba^{++}$ and $Sr^{++}$ ions. Aqueous phase 4 can also contain electrolytes. A preferred chelating agent for utilization in internal aqueous phase 4 is 0.25 to about 0.5M diethylenetriaminepentaacetic acid (DTPA). Said acid is sold under the HAMP-EX® trade name by W. R. Grace Co. located in Nashua, N.H. HAMP-EX acid is a chelating or complexing agent for barium and is very slightly soluble in water. This water soluble complexing agent at high pH complexes the barium ion more strongly than does the oil soluble complex used in liquid membrane phase 6. It also draws the barium ions out of the complex in liquid membrane phase 6 and binds them into internal aqueous phase 4.

Liquid membrane phase 6 is a non-aqueous phase, comprised preferably of liquid hydrocarbons which separate the external aqueous phase 2 from internal aqueous phase 4. Separation occurs because said non-aqueous phase forms an envelope around the internal aqueous phase 4. Said envelope contains one or more chelating or complexing agents for $Ba^{++}$ and $Sr^{++}$ which are stronger chelants than in external aqueous phase 2 and weaker than those contained in internal aqueous phase 4. Generally, said liquid hydrocarbon comprises a water-immiscible solvent which may be chosen from the class consisting of hydrocarbons, halogenated hydrocarbons and ethers. The oil component, of course, must be liquid at the conditions at which the instant compositions are used, must be capable of dissolving the particular additives chosen, and also must be capable, in conjunction with the particular additive, of forming a stable water in oil emulsion with internal aqueous phase 4.

A method which is suitable for preparing a hydrocarbonaceous liquid membrane is described in U.S. Pat. No. 4,259,189 issued to Li on Mar.31, 1981, which is hereby incorporated by reference. This patent also describes strengthening agents, additives, and surfactants which can be used in the practice of this invention for making liquid membranes. The liquid membrane phase surrounding said internal aqueous phase 4 is composed of a hydrocarbonaceous material. This hydrocarbonaceous material has combined therein a first complexing agent known as for example, tertiary alkyl amine, either in the form of the free amine or the quaternary amine salt. Tertiary alkyl amines are hereinafter referred to as "TBA". ALIQUAT® 336 tricapryl methyl ammonium ion ($Br^-$) is one example of a TBA which can be used herein. This TBA can be purchased from General Mills Chemicals, Inc. Many types of alkyl groups can be employed in the TBA as long as they contain a chain of sufficient length to impart oil solubility. TBA is combined with the hydrocarbonaceous liquid which liquid is in an amount sufficient for use in removing scale from oil and gas production equipment.

Scale removal in the external and internal phase is effected with a polyaminopolycarboxylic acid such as EDTA or DTPA as a chelant or complexing agent which is intended to form a stable complex with the cation of the alkaline earth scale-forming material. Of these chelants, DTPA is the preferred species since it forms the most soluble complexes at the greatest reaction rate. EDTA may be used but is somewhat less favorable as will be shown below. The chelant may be added in the acid form or, alternatively, as a salt of the acid, preferably the potassium salt. In any event the alkaline conditions used in the scale removal process will convert the free acid to the salt.

The concentration of the chelant in the external phase should normally be at least 0.1M in order to achieve an acceptable degree of scale removal. Chelant concentrations in excess of 1.0M are usually not necessary and concentrations from about 0.3M up to about 0.5M will normally give good results. Although higher concentrations of chelant may be used, there is generally no advantage to doing so because the efficiency of the chelant utilization will be lower at excess chelant concentrations. This economic penalty is particularly notable in oil field operations where large volumes of solvent may be used, especially in formation scale removal treatment.

The concentration of the catalyst or synergist in the external phase only will be of a similar order. Thus, the amount of the carboxylate catalyst in the external phase should normally be at least 0.1M in order to achieve a perceptible increase in the efficiency of the scale removal, and concentrations from about 0.3M up to about 0.6M will give good results. Although higher concentrations of the oxalate e.g. above 1.0M may be used, there is generally no advantage to doing so because the efficiency of the process will be lower at excess catalyst concentrations. Again, this economic penalty is particularly notable in oil field operations.

Scale removal is effected under alkaline conditions preferably at pH values of from about 8.0 to about 14.0, with optimum values being from about 11 to 13, preferably about 12.

The external phase comprises about 0.1 to about 1.0M of ethylenediaminetetraacetic acid (EDTA) or diethylenetriaminepentaacetic acid (DTPA), or salts of these acids, as a chelant and a carboxylate catalyst. The carboxylate catalyst is added to aqueous EDTA or DTPA in about 0.01 to about 1.0M, preferably up to about 0.5M. The pH of the external phase is then adjusted by the addition of a base to the desired value, preferably to about pH 12. It is important to avoid the use of sodium cations when operating at high pH values, i.e., above pH 8. Instead, potassium or, alternatively, cesium is used as the cation for the scale-removing agent. Potassium is preferred for economy as well as availability. Thus, normally when making the external phase solvent, the chelant and the carboxylate catalyst will be dissolved in the water to the desired concentration. Afterwards, a potassium base, usually potassium hydroxide, is added to bring the pH to the desired value of about 12.

In one procedure, the emulsified aqueous mixture is circulated through tubular goods into the well and returned to the surface through the annular space between the production tube and the casing (or vice versa). Also, the emulsified aqueous mixture may be pumped down through the production tubing and into the formation, thereby cleaning the well, its casing, and the formation pore space by dissolving barium sulfate present as it flows over and along surfaces requiring cleaning. The spent emulsion containing dissolved, complexed barium together with any other alkaline earth metal cations which may have been present in the scale, especially radium, can be subsequently returned to the surface, for example, by displacement or entrainment with the fluids that are produced through the well after the cleaning operation. In an alternative manner, the aqueous mixture or cleaning solution may be applied batchwise fashion, for example, by flowing the solution into the well and optionally into the pore spaces of the adjacent earth formation. The solution remains in contact with the surfaces that are covered with barium sulfate scale, for a period of time sufficient to dissolve the scale.

In order to demonstrate the barium sulfate scale-dissolving capacities of the composition, several aqueous solutions comprising the external phase have been tested in laboratory tests the results of which are described in the discussions which follow. The experiments described below, except as noted below, were carried out in a cylindrical glass vessel having a height of 10 cm and an internal diameter of 7.5 cm. Barium sulfate or, when applicable, other sulfates or solid scale components, were agitated with selected solvents. The rates of dissolution and final dissolved concentrations were then determined. The results are reported graphically in the Figures.

As shown in FIG. 1, DTPA alone and DTPA with various substituted acetic acids were compared at 100° C. The results demonstrate that the DTPA/carboxylate combination complexes more barium sulfate than DTPA alone.

Figure 2:
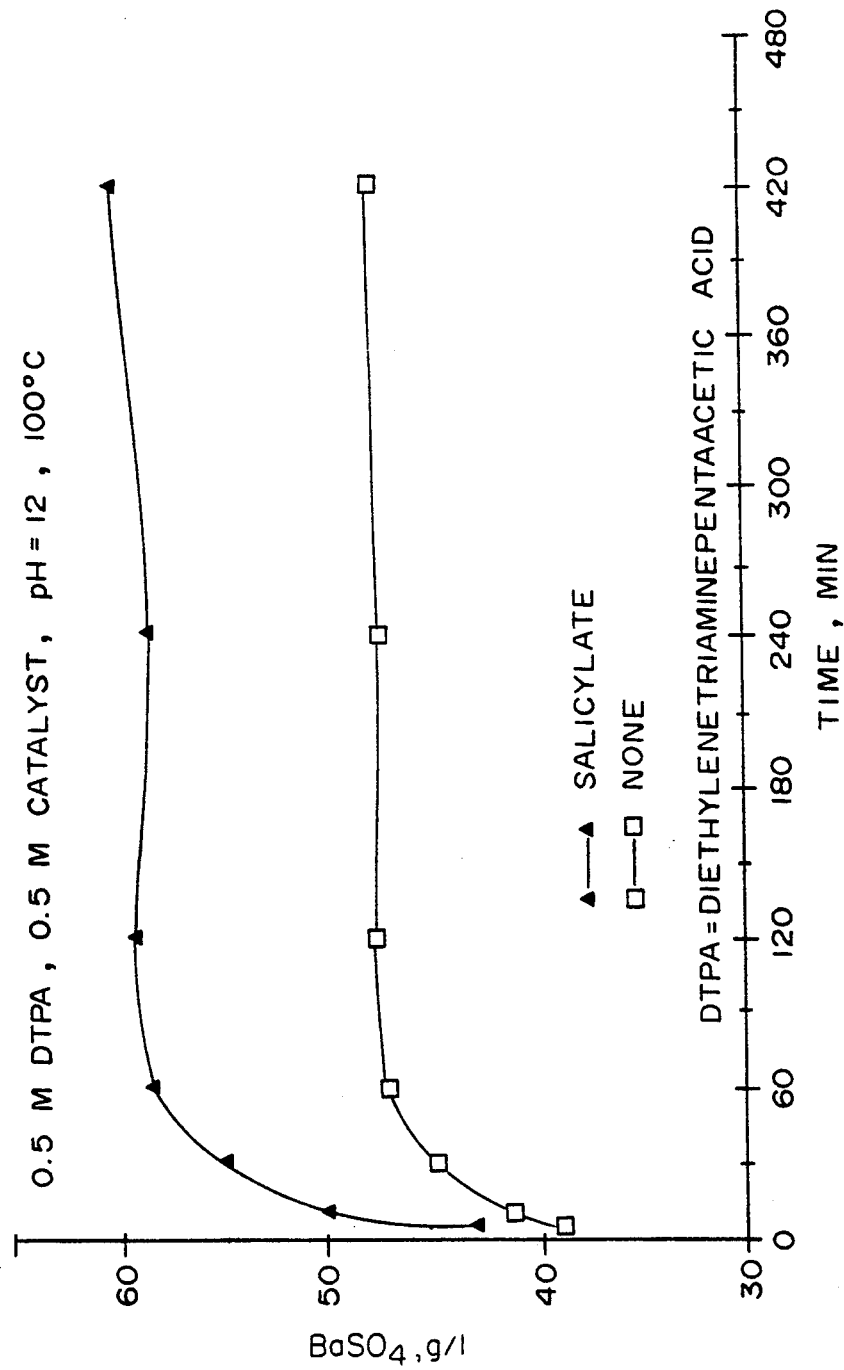
FIG. 2 is a graph which shows the rate of dissolution of barium sulfate in solutions of DTPA containing salicylic acid as a synergist.

FIG. 2 compares the relative rates of barium sulfate dissolution using DTPA alone and DTPA in combination with salicylic acid. As shown in the Figure, the addition of salicylic acid is effective to almost double the degree of barium sulfate dissolution.

The present scale removal technique is very effective for lowering residual radioactivity of pipe contaminated with radium-containing barium sulfate scale. As noted above, radium is frequently precipitated with barium in scale with the result that scaled pipe is often radioactive to the point that it cannot safely be used. Using the present scale removal compositions, activity can be reduced to an acceptable level in comparatively short times without further treatment. Some residual activity arises from lead and other radio-isotopes which are not dissolved in the solvent. These isotopes are decay products of radium and have originally been incorporated in the scale with barium and radium sulfates. Although they are not removed chemically by the present scale removal technique, dissolution of barium scale together with other alkaline earth metal sulfates enables these other components of the scale to be removed by simple abrasion, for example, by scrubbing with or without a detergent/water scrub solution. In this way, the residual activity level may be reduced to a value below the appropriate regulatory standards. Thus, by using the present chemical scale removal technique in combination with a simple mechanical removal of loose, nonadherent material, previously radioactive pipe may quickly and readily be restored to a useful, safe condition.

Distilled water was used in the majority of the above tests (except the continuous flow loop tests) for determination of the rate of barium sulfate dissolution and saturation. Minor decreases in efficiency may be observed with tap water. About a 20 percent decrease in efficiency is expected when seawater is used. This is to be expected, since seawater has interfering ions, e.g. calcium and magnesium. These interfering ions complex with the chelating agent, either DTPA or EDTA, and reduce the overall dissolving power. Additionally, it has been determined that halide ions have a negative effect on dissolving power as a function of the size of the halide ion. Dissolution rate is increased as the halide ion size is reduced and the charge density is increased, i.e. in the order of iodide, bromide, chloride and fluoride. Fluoride ion enhances the effect of EDTA-based solvents, but not DTPA: fluoride inhibits most DTPA/catalyst solvents.

As noted above, the effect of cations is also very important to the success of the scale solvent, especially when added with the sizable portion of caustic required to adjust the pH to 12. Dissolution is enhanced as the size of the cation is increased, i.e. lithium, sodium, potassium and cesium. Lithium and sodium hydroxides in the presence of EDTA, or DTPA, and catalysts are not soluble at a pH of 12, the optimum value. Cesium is too difficult to obtain, both in quantity and price. Therefore, potassium hydroxide, in the form of caustic potash, is the pH adjusting reagent of choice.

One example of a preferred aqueous solvent which can be used in the external phase comprises 0.25M DTPA and 0.3M salicylic acid adjusted to a pH of 12 with potassium hydroxide.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A liquid membrane method for removing scale from equipment containing same via an emulsion consisting essentially of:
    (a) contacting said scale-containing equipment with an external aqueous phase which causes said scale to solubilize into scale-forming ions in said external aqueous phase which consists essentially of:
        i) an aqueous solution having a pH of from about 8 to about 14;
        ii) a first complexing agent of a polyaminopolycarboxylic acid or a salt of such acid;

iii) a catalytic quantity of anions of at least one monocarboxylic acid which acts with said first complexing agent to substantially enhance said agent's ability to solubilize scale;

(b) mixing an emulsion into said external aqueous phase which emulsion contains an immiscible liquid hydrocarbonaceous membrane phase having a second complexing agent for said scale-forming ions therein stronger than said first complexing agent enveloped around droplets of an internal aqueous phase having a stronger third complexing agent for scale-forming ions than said second complexing agent; and (c) transferring said scale-forming ions from said external aqueous phase into said hydrocabonaceous membrane phase which ions are then transferred from said hydrocarbonaceous membrane phase into said internal aqueous phase where said ions are accumulated and concentrated which causes scale to be removed from said equipment within a substantially reduced time period than is possible with said first and third complexing agents alone.

2. The method as recited in claim 1 where the first and third complexing agent is EDTA or DTPA.

3. The method as recited in claim 1 where the pH is obtained by the addition of hydroxides of potassium.

4. The method as recited in claim 1 wherein step (a) said scale-forming ions comprise calcium, barium and strontium ions.

5. The method as recited in claim 1 where in step (b) said hydrocarbonaceous membrane phase has tertiary alkyl amines (TBA) as a second complexing agent.

6. The method as recited in claim 1 where the pH is adjusted to about 12 with potassium hydroxide, the first and third complexing agents comprise DTPA and the synergist in the external phase comprises anions of salicylic acid.

7. The method as recited in claim 1 where the anions of said acid are present in a concentration of from about 0.1M to about 0.6M.

8. The method as recited in claim 1 where the anions are obtained from a substituted acetic acid.

9. The method as recited in claim 1 where anions are obtained from a substituted acetic acid which comprises mercaptoacetic acid, hydroxyacetic acid or aminoacetic acid.

10. The method as recited in claim 1 where the anions are obtained from an aromatic carboxylic acid which has the carboxyl group attached directly to the aromatic nucleus.

11. The method as recited in claim 1 where the anions are obtained from salicylic acid.

12. A liquid membrane method for removing alkaline earth sulfate scale from equipment consisting essentially of:

(a) contacting said scale-containing equipment with an external aqueous phase which causes said scale to solubilize into scale-forming ions in said external aqueous phase which consists essentially of:
i) an aqueous solution having a pH of from about 8 to about 14;
ii) a first complexing agent comprising EDTA, DTPA, and salts, or mixtures thereof in an amount of from about 0.10 to about 0.25M;
iii) a catalytic quantity of anions from at least one monocarboxylic acid selected from a member of the group consisting of a substituted monocarboxylic acid, an unsubstituted monocarboyxlic acid, or an aromatic carboxylic acid which acts with said first complexing agent to substantially enhance said agent's ability to solubilize scale;

(b) transferring said ions from said external phase into an immiscible tertiary alkyl amine (TBA) second complexing agent for reacting said scale-forming ions which is stronger than said first complexing agent;

(c) transferring and concentrating said scale-forming ions from said tertiary alkyl amine into said internal aqueous phase which has a stronger third complexing agent than said second complexing agent which third complexing agent comprises EDTA, DTPA, their salts and mixtures thereof in an amount of about 0.25 to about 0.50M; and (d) transferring said scale-forming ions from said external aqueous phase into said tertiary alkyl amine which ions are then transferred from said amine into said internal aqueous phase where said ions are accumulated and concentrated which causes scale to be removed from said equipment within a substantially reduced time period than is possible with said first and third complexing agents alone.

13. The method as recited in claim 12 wherein step (a) said scale-forming ions comprise calcium, barium and strontium ions.

14. The method as recited in claim 12 where the pH is obtained by the addition of hydroxides of potassium.

15. The method as recited in claim 12 where the pH is adjusted to about 12 with potassium hydroxide, and the first and third complexing agents comprise DTPA.

16. The method as recited in claim 12 where the anions of monocarboxylic acid are present in a concentration of from about 0.1M to about 0.6M.

17. The method as recited in claim 12 where said solution in contact with the scale is of a temperature from about 25° to about 100° C.

18. The method as recited in claim 12 where the scale is contacted with said solution for up to about 4 hours.

19. The method as recited in claim 12 where said scale contains radioactive elements.

20. The method as recited in claim 12 where the anions are obtained from a substituted acetic acid.

21. The method as recited in claim 12 where anions are obtained from a substituted acetic acid which comprises mercaptoacetic acid, hydroxyacetic acid of aminoacetic acid.

22. The method as recited in claim 12 where the anions are obtained from an aromatic carboxylic acid which has the carboxyl group attached directly to the aromatic nucleus.

23. The method as recited in claim 12 where the anions are obtained from salicylic acid.

24. A liquid membrane method for reducing radioactivity of oil field equipment contaminated with radioactive alkaline earth metal scale consisting essentially of:

a) contacting said equipment with an external aqueous phase which causes said scale to solubilize into scale-forming ions in said external aqueous phase which consists essentially of:
i) an aqueous solution having a pH of about 11 to about 13;
ii) a first complexing agent comprising DTPA, salts, or mixtures thereof in an amount of from about 0.10 to about 0.25M;

iii) a catalytic quantity of anions of 0.5M salicylic acid which acts with said first complexing agent to substantially enhance said agent's ability to solubilize scale;

b) transferring said ions from said external phase into an immiscible tertiary alkyl amine (TBA) second complexing agent for reacting said scale-forming ions which is stronger than said first complexing agent;

c) transferring and concentrating said scale-forming ions from said tertiary alkyl amine into said internal aqueous phase which has a stronger third complexing agent than said second complexing agent which third complexing agent comprises DTPA, its salts or mixtures thereof in an amount of about 0.25 to about 0.50M; and d) transferring said scale-forming ions from said external aqueous phase into said tertiary alkyl amine which ions are then transferred from said amine into said internal aqueous phase where said ions are accumulated and concentrated which causes scale to be removed from said equipment within a substantially reduced time period than is possible with said first and third complexing agents alone thereby reducing the radioactivity of said equipment.

25. The method as recited in claim 24 wherein step (a) said scale-forming ions comprise calcium, barium and strontium ions.

26. The method as recited in claim 24 where the pH is obtained by the addition of hydroxides of potassium.

27. The method as recited in claim 24 where said solution in contact with the scale is of a temperature from about 25° to about 100° C.

28. The method as recited in claim 24 where the scale is contacted with said solution for up to about 4 hours.

29. The method as recited in claim 24 where the equipment is subjected to mechanical abrasion after removal of the scale by the solution.

30. The method as recited in claim 24 where the scale comprises barium sulfate.

31. The method as recited in claim 24 where said equipment comprises tubular goods.

* * * * *